(12) United States Patent
Cromer et al.

(10) Patent No.: US 8,004,244 B2
(45) Date of Patent: Aug. 23, 2011

(54) POWER SUPPLY METHODS AND ARRANGEMENTS

(75) Inventors: Daryl Cromer, Cary, NC (US);
Anthony F. Corkell, Cary, NC (US);
Seita Horikoshi, Zama (JP); Takeshi Matsumoto, Fujisawa (JP); Shigefumi Odaohhara, Yamato (JP); Tin-Lup Wong, Chapel Hill, NC (US)

(73) Assignee: Lenvo (Singapore) Pte. Ltd., Singapore (SG)

( * ) Notice: Subject to any disclaimer, the term of this patent is extended or adjusted under 35 U.S.C. 154(b) by 580 days.

(21) Appl. No.: 11/839,091

(22) Filed: Aug. 15, 2007

(65) Prior Publication Data

US 2008/0042618 A1 Feb. 21, 2008

Related U.S. Application Data

(60) Provisional application No. 60/822,506, filed on Aug. 15, 2006.

(51) Int. Cl.
*H02J 7/00* (2006.01)

(52) U.S. Cl. .................... 320/134; 320/135; 320/136

(58) Field of Classification Search ............ 320/134, 320/135, 136
See application file for complete search history.

(56) References Cited

U.S. PATENT DOCUMENTS

| | | | | |
|---|---|---|---|---|
| 5,043,650 A | * | 8/1991 | Bhagwat et al. | 320/150 |
| 5,909,103 A | * | 6/1999 | Williams | 320/134 |
| 6,060,864 A | * | 5/2000 | Ito et al. | 320/136 |
| 6,064,185 A | * | 5/2000 | Ohno | 320/136 |
| 6,992,463 B2 | * | 1/2006 | Yoshio | 320/134 |
| 2003/0222619 A1 | * | 12/2003 | Formenti et al. | 320/119 |
| 2005/0237028 A1 | * | 10/2005 | Denning | 320/134 |
| 2006/0139004 A1 | * | 6/2006 | Uesugi et al. | 320/132 |

* cited by examiner

*Primary Examiner* — Edward Tso
*Assistant Examiner* — Samuel Berhanu
(74) *Attorney, Agent, or Firm* — Ference & Associates LLC

(57) ABSTRACT

In the context of a notebook computer, multiple battery safety measures in the computer, battery pack, and individual battery cells. These battery packs include industry standard safety mechanisms as well as additional safeguards designed to increase safety. The additional safeguards can be categorized in the following ways. The first safeguard deals with multiple, independent levels of battery monitoring. The second safeguard employs abnormal condition detection methods. The third safeguard deals with improvements to mechanical and thermal design.

16 Claims, 5 Drawing Sheets

POWER SUPPLY METHODS AND ARRANGEMENTS

CLAIM FOR PRIORITY

This application claims priority from U.S. Patent Application Ser. No. 60/822,506, filed on Aug. 15, 2006, and which is hereby incorporated by reference as if fully set forth herein.

FIELD OF THE INVENTION

The present invention relates generally to batteries for notebook systems, specifically, Lithium Ion (Li-Ion) batteries.

BACKGROUND OF THE INVENTION

There are many advantages to using notebook computers in the current marketplace. They enable users to access the Internet and email wherever they carry their laptop. However, these advantages may be marred by certain disadvantages encountered only when using a notebook computer. A main disadvantage of utilizing notebook computers often occurs with the battery of the notebook computer. In many computers, battery life is too short. However, there is a more imminent threat—overheating and overcharge of the battery. This threat can lead to unsafe operating conditions of a notebook. Recently, short-circuits in the battery have been shown to cause the battery to overheat, causing a risk of smoke and/or fire.

Lithium Ion (Li-Ion) batteries used in most notebook computers are designed to be used with dedicated battery management circuitry to prevent the battery cells from being used outside of safe operating areas. The conditions that should be avoided with Li-Ion batteries are: Over-discharge (or under-voltage), Over-charge (or over-voltage), Over-current, and Over-temperature. These conditions can adversely affect the performance and safety of a Li-Ion battery. Industry standards exist that monitor and set limits for these conditions. However, industry standards that are currently being met are not stringent enough to provide a safe computing atmosphere for notebook computer users. Thus, there exists a need in the art for a safer, improved battery for a notebook computer that exceeds industry standards for safety.

SUMMARY OF THE INVENTION

The present invention employs multiple battery safety measures in notebook computers, the battery pack, and the individual battery cells within the battery pack. These battery packs include industry standard safety mechanisms as well as additional safeguards designed to increase safety. The additional safeguards can be categorized in the following ways. The first safeguard deals with multiple, independent levels of battery monitoring. The second safeguard employs abnormal condition detection methods. The third safeguard deals with improvements to mechanical and thermal design.

In summary, one aspect of the invention provides a computer battery pack comprising: a battery for powering a computer system; and a control module which controls the battery and monitors a battery condition; the control module further acting to: prompt a disablement of battery powering of the computer system responsive to a first criterion associated with the battery condition; and prompt a disablement of battery powering of the computer system responsive to a second criterion associated with the battery condition; wherein the control module monitors and responds to the first and second criteria independently.

Another aspect of the invention provides a computer battery pack comprising: a battery; the battery comprising a plurality of cell blocks, the cell blocks each comprising a plurality of battery cells; and control circuitry which controls the battery; and a protection mechanism physically contiguous to a plurality of the cell blocks, the protection mechanism acting to avert inadvertent battery failure.

Yet another aspect of the invention provides a method of controlling and monitoring a computer battery, the method comprising: providing a battery; monitoring a condition of the battery; prompt a disablement of battery powering of the computer system responsive to a first criterion associated with the battery condition; and prompt a disablement of battery powering of the computer system responsive to a second criterion associated with the battery condition; wherein the disabling responsive to a first criterion is independent of the disabling responsive to a second criterion.

Furthermore, an additional aspect of the invention provides a program storage device readable by machine, tangibly embodying a program of instructions executable by the machine to perform a method of controlling and monitoring a computer battery comprising: providing a battery; monitoring a condition of the battery; prompt a disablement of battery powering of the computer system responsive to a first criterion associated with the battery condition; and prompt a disablement of battery powering of the computer system responsive to a second criterion associated with the battery condition; wherein the disabling responsive to a first criterion is independent of the disabling responsive to a second criterion.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
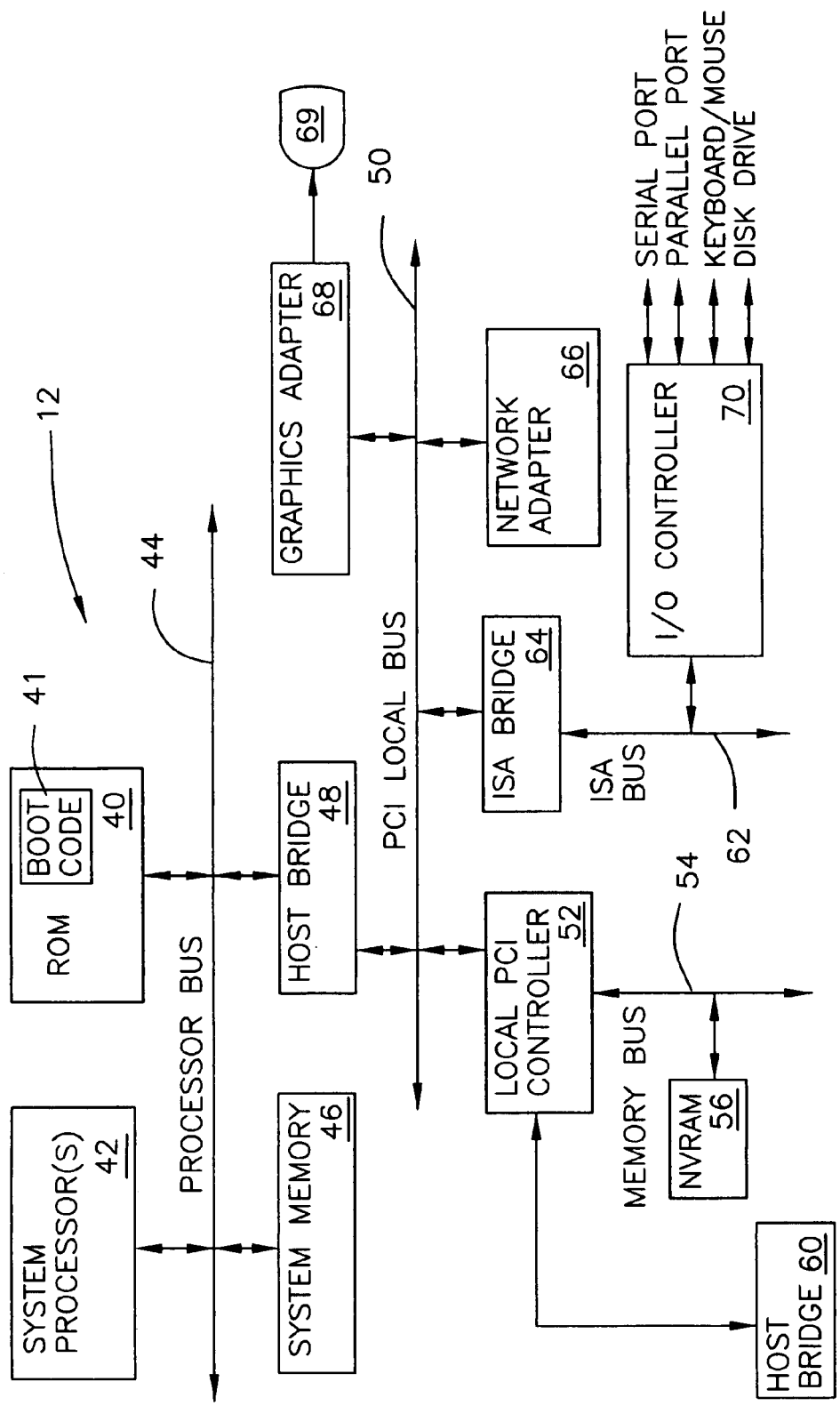
FIG. 1 is a block diagram of a computer system according to a preferred embodiment of the present invention.

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of selected embodiments of the invention.

One or more functional units described in this specification may be labeled as a "module", in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

As mentioned above, the present invention employs multiple battery safety measures in notebook computers, the battery pack, and the individual battery cells within the battery pack. These battery packs include industry standard safety mechanisms as well as additional safeguards designed to increase safety. The additional safeguards can be categorized in the following ways. The first safeguard deals with multiple, independent levels of battery monitoring. The second safeguard employs abnormal condition detection methods. The third safeguard deals with improvements to mechanical and thermal design.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system in which the power is supplied by a battery pack.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports. Of course, it should be appreciated that the system 12 may be built with different chip sets and a different bus structure, as well as with any other suitable substitute components, while providing comparable or analogous functions to those discussed above.

Figure 2:
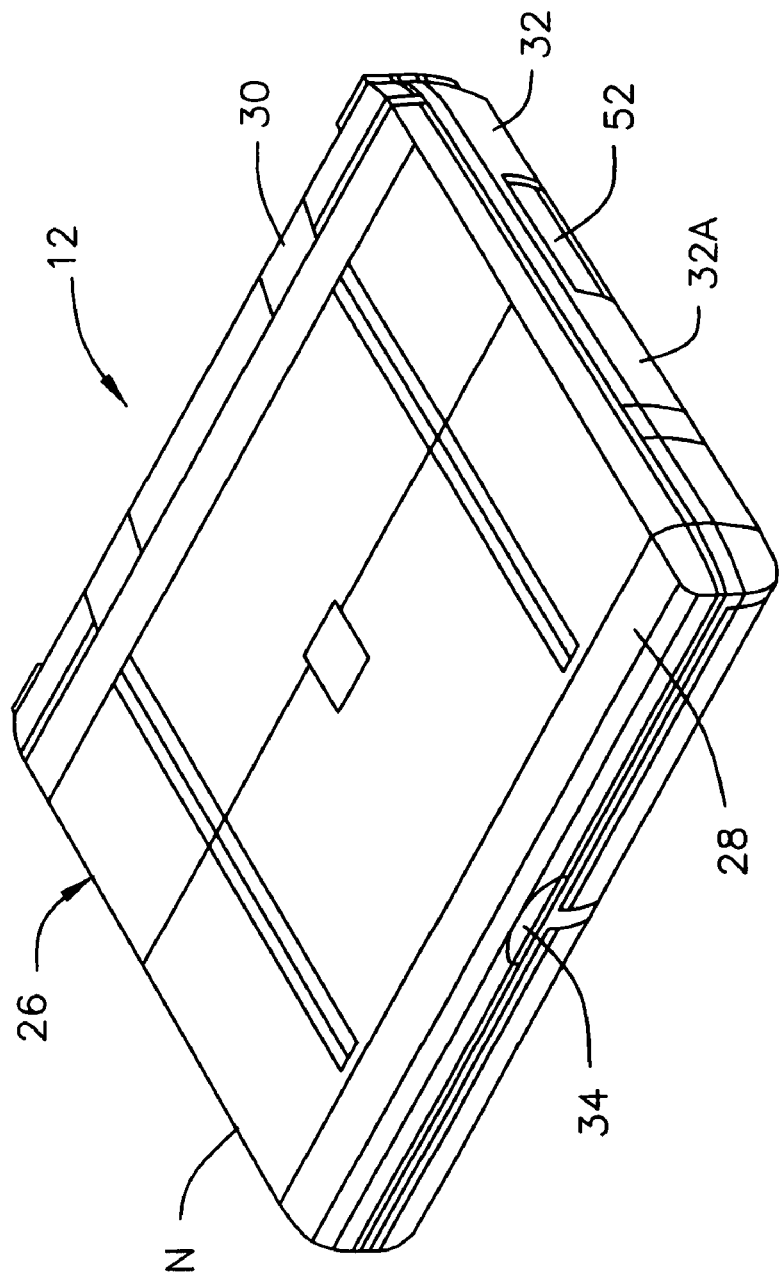
FIG. 2 is a perspective view illustrating an embodiment of a portable computer.
Figure 3:
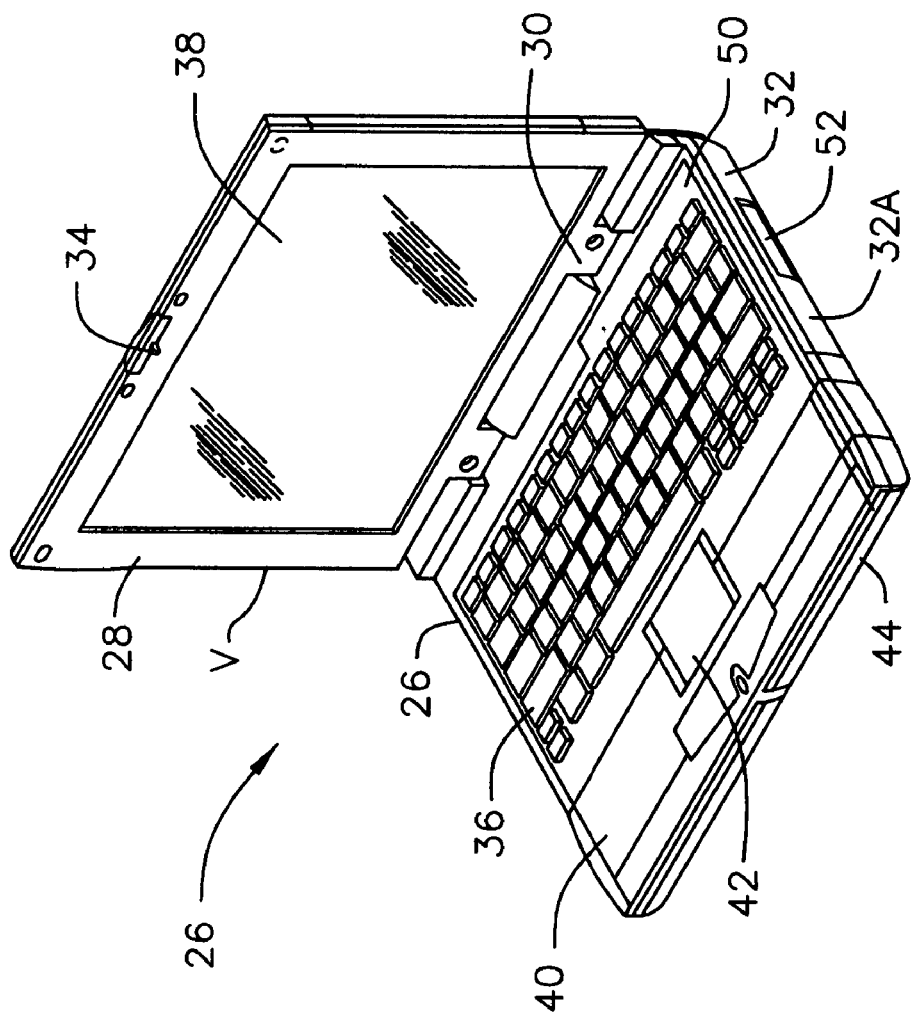
FIG. 3 is another perspective view illustrating an embodiment of a portable computer.

Referring to FIG. 2, illustrated is a portable, notebook size computer designated 26 comprising a self-contained system, such as that illustrated at 12 in FIG. 1, and including a hinged top or lid 28 rotatable about a hinge or hinges 30 from a nested position, "N," with a horizontal chassis base 32, to a substantially vertical or open position "V," FIG. 3. Opening of the notebook style portable computer by manipulation of a latch 34, reveals of plurality of input components such as a keyboard of keys 36 on base 32, and a monitor screen 38 mounted in lid or top 28. Base 32 includes a palm or wrist area 40 including an input area 42 of the input system 16 positioned above a battery housing 44 and adjacent keys 36. Base 32 includes an exterior surface 50. The keyboard keys 36 and also the adjacent palmrest area 40 are provided on the exterior surface 50.

A module bay 52 is provided in a side 32a of base 32. Bay 52 may house a removable CD-ROM module or hard disk drive (HDD) module as is well known. Also, bay 52 may house a battery module 54 which may be interchanged in the bay 52 with the CD-ROM or HDD modules. In this manner, a removable storage device such as the CD-ROM or HDD module is replaced with an additional battery. Furthermore, the battery module 54 may be interchanged between other notebook computers or between a notebook computer and a desktop computer.

Figure 4:
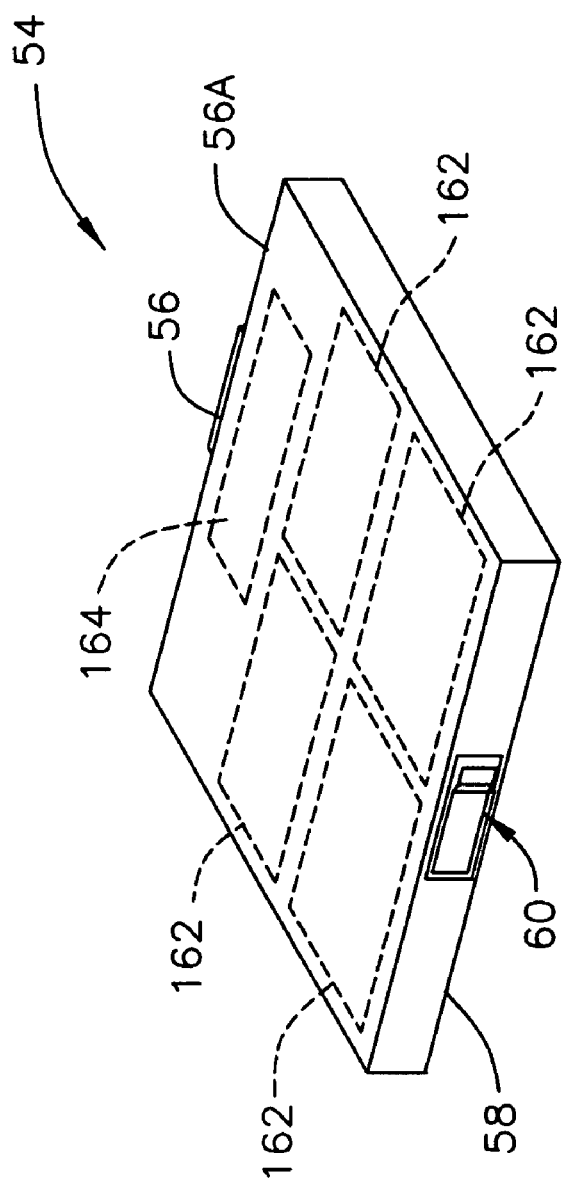
FIG. 4 is a perspective view illustrating an embodiment of a battery module.

The battery module 54, FIG. 4, is generally rectangular and includes a plug 56 at a first end 56a which is inserted into the bay 52. A plug receptacle (not shown) is positioned within bay 52 for receiving plug 56. A second end 58 of battery module 54 seats flush with side 32a of base 32 when the module 54 is inserted into bay 52. A latch device 60 at second end 58, provides for easy retention and removal of battery module 54 in bay 52. A plurality of battery cells 162 are positioned within module 54, and some basic interface circuitry 164 is also provided (e.g., on a printed circuit board).

Figure 5:
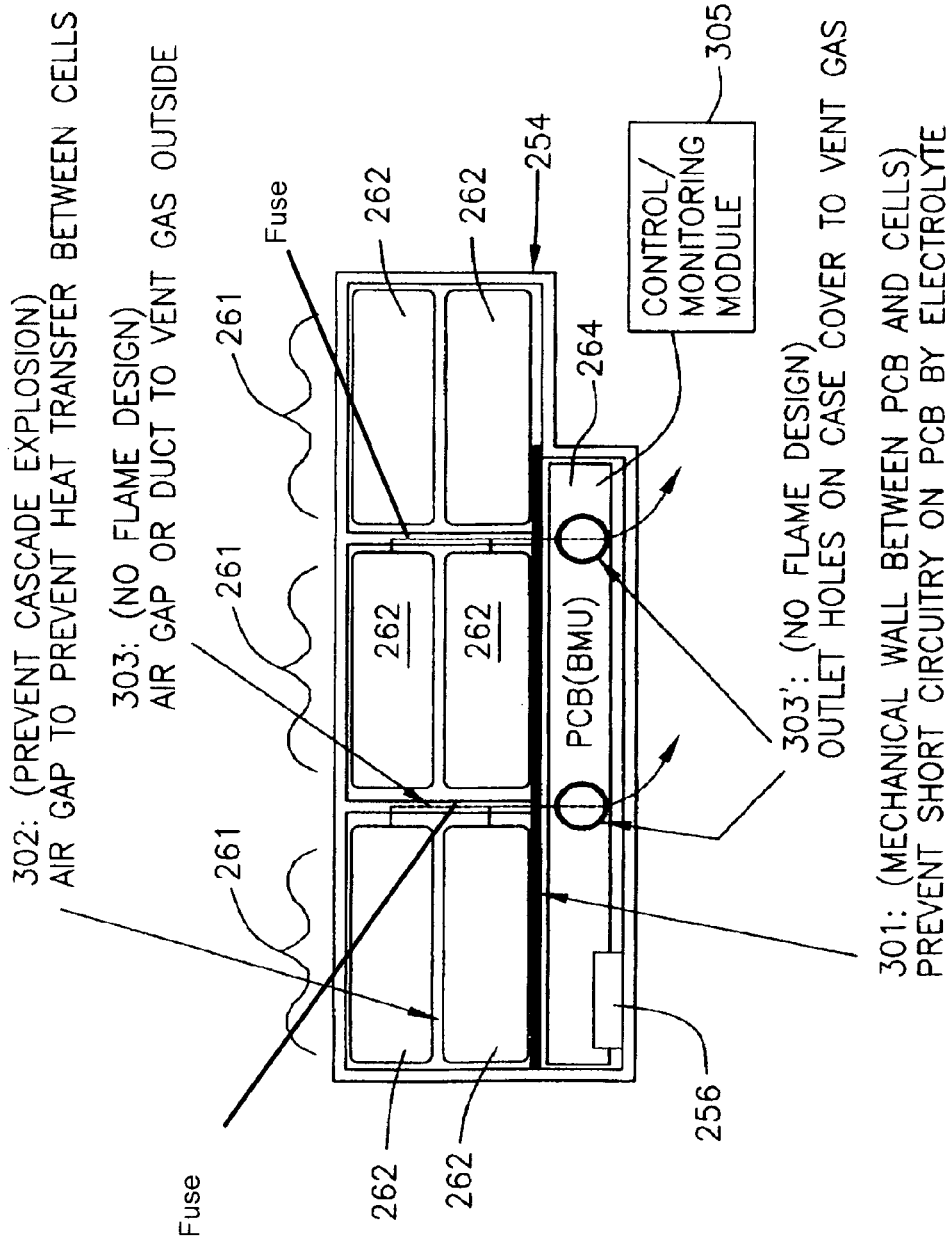
FIG. 5 illustrates an example of the battery pack mechanical design features.

An exemplary battery pack of the present invention is illustrated in FIG. 5. Specific features of the design that increase safety are also illustrated. Components in FIG. 5 analogous to those found in FIG. 4 bear reference numerals advanced by a multiple of 100.

As shown, a barrier 301 is preferably provided between the Printed Circuit Board (PCB) 264 and battery cells 262. Specifically, a mechanical wall 301 between the battery cells 262 and the PCB 264 has been designed to prevent a short circuit on the PCB 264 caused by electrolyte leakage from battery cells 262.

In accordance with at least one embodiment of the present invention, there is also maintained an air gap separation between cells as described above. Thus, in order to avert a cascade event, the battery pack 254 preferably includes spacing (302) between battery cells 262. This is designed to inhibit heat transfer and prevent a failure in one cell from causing thermal runaway in an adjacent cell. As mentioned above, the battery pack 254 also of the present invention preferably includes pathways 303 for evacuating hot gas as quickly and safely as possible; the pathways 303 may preferably be disposed between "blocks" 261, or smaller groups, of several battery cells 262. Based on intensive experiments, it has been found that venting hot gas outside the battery pack 254 as quickly as possible is effective in preventing ignition when hot gas is created due to a fault condition. Battery packs 254 in accordance with the present invention preferably both have paths 303 inside the battery pack as well as vents 303' on the pack casing to allow hot gas to be vented in a most efficient—and no-flame—manner. Such venting is preferably directed into the interior of a computer system, as will be better appreciated further below.

Elaborating further on various embodiments of the present invention and their features, the "first safeguard" mentioned earlier involves multiple, independent levels of battery monitoring. This relates to the conditions listed above that should be monitored and avoided to prevent the battery cells from being used outside of safe operating areas. These conditions are: over-charge (or over-voltage), over-discharge (or under-voltage), over-current, and over-temperature.

Industry standards (elaborated on herebelow) involve only a single level of protection for over-charge. The standard is to monitor the battery voltage and interrupt the charge current if the battery voltage rises too high. Battery packs 254 in accordance with at least one embodiment of the present invention, however, preferably have a redundant over-charge protection utilizing two independent circuits to monitor battery voltage to protect against over-charge situations; these may be contained in a control/monitoring module 305 as shown which can be part of or independent from PCB 264. If the voltage rises to a level that would indicate failure of the battery management circuitry, the battery can be permanently disabled. The Institute of Electrical and Electronics Engineers (IEEE) has created a voluntary standard, IEEE 1625, that outlines design guidelines for notebook computer battery packs and systems. As discussed below, battery packs 254 in accordance with the present invention meet or exceed the guidelines set forth in IEEE 1625.

Specifically, IEEE 1625 guidelines specify only one level of protection at 4.35 V/cell. In accordance with at least one preferred embodiment of the present invention, however, two independent levels of protection with tighter specifications are provided. The first form of protection, via the microprocessor unit (MPU), triggers a fuse on the charge/discharge line at a specified voltage for the battery cell(s) in question, such as 4.24 V/cell or above. The second protection, via the interface circuitry (IC), e.g., as contained on the PCB 264, triggers a fuse on the charge/discharge line at a specified voltage for the battery cell(s) in question, such as 4.35 V/cell or above.

The industry standard for battery design in dealing with over-discharging involves only a single level of protection for over-discharge conditions. The current standard is to monitor the battery voltage and interrupt the battery's discharge current if the battery voltage falls too low. In accordance with at least one preferred embodiment of the present invention, however, the battery packs 254 are designed with redundant over-discharge protection that utilizes two independent circuits, e.g., as associated with control/monitoring module 305, to monitor battery voltage to protect against over-discharge situations. If the voltage falls to a level that would indicate failure of the battery management circuitry, the battery is designed to be permanently disabled.

Specifically, the industry standard has only one level of protection at approximately 2.50 V/cell. The battery packs 254 of the present invention have a second level of protection in order to detect copper deposition which may cause a safety incident. The first level of protection provided in accordance with a preferred embodiment of the present invention can be embodied as follows. If the cell voltage is a specified voltage for the battery cell(s) in question, such as 2.5V or less, the discharge field-effect transistor (FET) is turned off. The discharge FET will only be turned on when the voltage exceeds a specified voltage for the battery cell(s) in question, such as 3.2V. The second level of protection detects copper deposition. If the cell voltage is below a specified voltage for the battery cell(s) in question, such as 1.3V or less, when a trickle charge is initiated, the charging of the cell is permanently disabled.

Notebook systems configured in accordance with at least one presently preferred embodiment of the present invention exceed guidelines set forth in IEEE 1625 regarding notebook interaction with batteries, and are preferably designed to employ over-current protection for both charge and discharge currents. Monitoring both charge and discharge currents help protect against possible faults during both charging, and regular operation. Additionally, both hardware and software methods can preferably be used for monitoring and protection against over-current. Specifically, in addition to the "taper current detection" which is common to the industry as a whole, the present invention preferably defines a specified voltage for the battery cell(s) in question, such as a cell voltage of 4.18 to 4.20 V/cell, in order to avoid overcharging.

Notebook computers configured in accordance with at least one embodiment of the present invention include multiple independent safeguards to prevent battery packs from getting too hot. The temperature of the battery cells inside the battery pack are preferably monitored by the battery management circuitry, and particularly in conjunction with control/monitoring module 305. Charging preferably starts when the battery temperature is between 0° C. and 50° C. If at some point during charge the battery pack temperature goes outside the range of −2° C. to 60° C., preferably charging of the battery will be stopped. During operation, if the temperature exceeds 70° C., the system will preferably automatically enter standby mode. If the temperature exceeds 73° C., the battery pack will preferably disable itself and will preferably reset when the temperature returns to 65° C. or lower. Specifically, the charge and discharge FETs will be turned off once the temperature exceeds 73° C., and the condition will only be reset when the temperature returns to 65° C. or lower. If the battery pack temperature exceeds 90° C., which most likely indicates either an external heat source or failure of the battery management circuitry, the battery is preferably permanently disabled through the triggering of a fuse on the charge/discharge line.

The second safeguard discussed above employs abnormal operation detection methods. Even with precise battery management circuitry, Li-Ion battery packs can operate abnormally due to manufacturing variances or external conditions. Examples include cell imbalance, operation of internal cell safety mechanisms, or short circuit of a cell. In the rare case of any of these abnormal operating conditions, it is important that the system detect the condition and disable the battery pack. If these abnormal conditions were to go undetected, it could lead to overcharge or over-current of some cells in the battery pack. These abnormal operation detection methods are not part of guidelines for industry standard battery designs, and have been implemented in accordance with at least one embodiment of the present invention in an effort to further increase the safety of the battery packs.

The battery packs used in notebook computers in accordance with at least one embodiment of the present invention contain multiple Li-Ion cells (262). Each battery pack 254 preferably contains 3 to 4 "blocks" 261 including 1 to 3 battery cells 262 each. For proper operation, all of the cell blocks 261 should be at the same voltage. If some battery cells 262 are at a different state of charge than others due to age or external conditions, then the blocks 261 can become imbalanced. When this occurs it can cause some cells in the pack to be overcharged and overcharging can led to cells being operated outside of their safe operating area. Via control/monitoring module 305, the battery pack 254 preferably monitors each block 261 separately and employs algorithms to determine if any blocks become imbalanced. If the conditions are met for cell imbalance, the battery pack 254 is preferably disabled automatically.

Specifically, the following methods are utilized to detect the events of CID (Current Interrupt Device that is internal to the battery cell) operation and TAB (connection between battery cells) disconnection and cell imbalance have been implemented to prevent overcharging. In accordance with a preferred embodiment of the present invention, if conditions in accordance with a predetermined equation or relationship are met, the fuse is triggered, permanently disabling the battery pack 254. For instance, a typical set of conditions to meet in order to trigger the fuse as such can be expressed as follows:

$$(\text{Max } \Delta V/\Delta t) > 1.5(*) \times (\text{Min } \Delta V/\Delta t)$$

Or $$(\text{Max } \Delta V/\Delta t) - (\text{Min } \Delta V/\Delta t) > 100 \text{ mV}(*)$$

(*) The exact value depends on cell and/or battery pack design.

Each of the individual cells 262 of the battery pack 254 preferably has internal features designed to disable itself if an abnormal condition occurs internally. Individual cell block monitoring and algorithms referenced above (via module 305) are preferably used to determine if one of the cell safety mechanisms has been used. If it is detected that that one of the safety mechanisms has been used, then the battery pack 254 preferably is disabled automatically. For example, in order to detect FET function failures resulted by an ohmic short or a condition in which the FET can not be turned on, thermal fuses are preferably located to detect the heat dissipated by the FET and shut down the circuitry.

Using the individual cell block monitoring and algorithms, the battery management circuitry in PCB 264, in conjunction with control/monitoring module 305, can detect if a single cell 262 is shorted, either internally or by external factors. If the conditions are met to detect that a cell has been shorted, the battery pack has been disabled. Specifically, the following method may preferably be implemented in order to detect an indication of an internal cell short at an early stage. The cell voltage is periodically measured even when the battery is neither charging nor discharging. If the voltage decreases more than the threshold value over a pre-determined time period, the fuse is triggered, permanently disabling the battery pack. The exact measurement time and threshold value depends on battery pack configurations. The following functions (by way of a non-restrictive example) may preferably be utilized in determining whether or not to disable the battery pack:

$$(\text{Max } \Delta V/\Delta t) > 25 \text{ mV/hr and } (\text{Max } \Delta V/\Delta t) > 5 \times (\text{Recent\_Historical\_Minimum } \Delta V/\Delta t)$$

or $$(\text{Max } \Delta V/\Delta t) > 25 \text{ mV/hr and } (\text{Max } \Delta V/\Delta t) > 5 \times (\text{Min } \Delta V/\Delta t)$$

The mechanical design of the battery pack 254 of the present invention preferably includes features intended to increase safety in the rare event of a battery cell failure due to internal or external conditions.

Extensive experiments have shown that if hot gas is removed from the battery pack in the event of a battery cell failure, such gas typically will not ignite. Battery packs 254 of the present invention thus preferably include pathways for the hot gas to be evacuated quickly and as safely as possible in the event of a battery cell failure. It is presently preferred to vent hot gases from the battery pack by exhausting the gases into the computer system (e.g., via pathways 303 and vents 303' as mentioned hereinabove).

Additionally, the battery pack design preferably utilizes air gaps 302 between adjacent cells. Intensive simulations and experiments indicate that this design feature can help prevent a failure in one battery cell from causing a cascading failure in an adjacent cell.

By way of further elaboration in connection with the embodiments of the present invention discussed and contemplated hereinabove, it should be understood that two pieces of logic are normally present in a battery circuit, namely, a battery management unit and a controller. The controller is often embodied by an "H8" component (a small microprocessor which runs code and reads a portion of the battery management unit) well known to those of ordinary skill in the art. Hereinabove, the battery management unit may be considered as being included in the battery management circuitry of PCB 264 has discussed hereinabove. The controller, on the other hand, may be considered as being included in the control/monitoring module 305 discussed hereinabove.

Generally, if a battery needs to be charged, a battery management unit sends a message to the controller, and the controller sends a charge. Also, a battery management unit typically stores information on the general condition of the battery (e.g., voltage, current). Preferably, in accordance with at least one presently preferred embodiment of the present invention, a battery management unit (e.g., as embodied in battery management circuitry on a PCB 264 as discussed hereinabove) is configured to monitor additional parameters, such as voltage/temperature change, and current leakage, that can be "seen" or read by the controller (e.g., as embodied by a control/monitoring module 305 as discussed hereinabove).

Further, in accordance with at least one presently preferred embodiment of the present invention, a battery management unit (e.g., as embodied in battery management circuitry on a PCB 264 as discussed hereinabove) preferably takes action in event of catastrophic event (e.g., shutting the battery down or killing it) without requiring a controller to take action.

To the extent that the venting of hot gases (e.g., via pathways 303 and vents 303') takes place as discussed hereinabove, it should be understood that by venting into the computer system the relative lack of oxygen therein will ensure a lesser likelihood of flaming and a greater likelihood of any flames being extinguished; thus, while the system might be damaged, the surroundings will likely be unaffected.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
a battery for powering a computer system; and
a control module which controls said battery and monitors a plurality of battery conditions;
said control module-further acting to:
use a first fuse to prompt disabling battery power to the computer system responsive to a first voltage associated with a battery over-charge condition; and
use a second fuse to redundantly prompt disabling battery power to the computer system responsive to a second voltage associated with the battery over-charge condition;
wherein said control module monitors and responds to the first voltage and the second voltage independently;
wherein, the second fuse is prompted to disable battery powering of the computer system as a back up to the first fuse; and wherein said control module further acts to: measure cell voltage when the battery is neither charging nor discharging power to a load; and responsive to a voltage decrease over a predetermined threshold over a predetermined time period when the battery is neither charging nor discharging power to a load, trigger a third fuse to disable the battery.

2. The apparatus according to claim 1, further comprising:
a battery management unit;
said battery comprising a plurality of cells;
said control module acting to prompt said battery management unit to trigger the first fuse at or above the first voltage associated with the battery over-charge condition per cell.

3. The apparatus according to claim 2, wherein:
said control module further acts to prompt said battery management unit to trigger the second fuse at or above the second voltage associated with the battery over-charge condition per cell.

4. The apparatus according to claim 1, wherein said control module further acts to:
use a first safeguard to prompt disabling battery power to the computer system responsive to a first voltage associated with a battery over-discharge condition; and
use a fuse to redundantly prompt disabling battery power to the computer system responsive to a second voltage associated with the battery over-discharge condition.

5. The apparatus according to claim 4, wherein:
the first safeguard is a discharge FET; and
said control module further acts to prompt a deactivation of said discharge FET at or below the first voltage associated with the battery over-discharge condition per cell.

6. The apparatus according to claim 1, wherein said control module further acts to:
detect taper current associated with battery over-current and detect a specified voltage associated with battery over-current.

7. The apparatus according to claim 1, wherein said control module further acts to:
detect a first temperature associated with battery overheating and detect a second temperature associated with battery overheating;
wherein the second temperature is greater than the first temperature;
wherein, responsive to detection of the first temperature, said control module acts to stop charging of the battery; and
wherein, responsive to detection of the second temperature, said control module acts to disable the battery.

8. The apparatus according to claim 1, wherein:
said control module acts to prompt a disablement of said battery responsive to a voltage imbalance in cell blocks.

9. The apparatus according to claim 1, further comprising a thermal fuse positioned to detect FET failure;
wherein, responsive to an FET failure, the thermal fuse is triggered to disable battery powering.

10. A method comprising:
providing battery power to a computer system;
monitoring a plurality of battery conditions of a battery;

using a first fuse to prompt disabling battery power to the computer system responsive to a first voltage associated with a battery over-charge condition; and
using a second fuse to redundantly prompt disabling battery power to the computer system responsive to a second voltage associated with the battery over-charge condition;
wherein disablement responsive to the first voltage is independent of disablement responsive to the second voltage; and
wherein, the second fuse is prompted to disable battery power to the computer system as a back up to the first fuse;
measuring cell voltage when the battery is neither charging nor discharging power to a load; and responsive to a voltage decrease over a predetermined threshold over a predetermined time period when the battery is neither charging nor discharging power to a load, triggering a third fuse to disable the battery.

11. The method according to claim 10, further comprising:
using a first safeguard to prompt disabling battery power to the computer system responsive to a first voltage associated with a battery over-discharge condition; and
using a fuse to redundantly prompt disabling battery power to the computer system responsive to a second voltage associated with the battery over-discharge condition.

12. The method according to claim 10, further comprising:
detecting taper current associated with battery over-current; and
detecting a specified voltage associated with battery over current.

13. The method according to claim 10, further comprising:
detecting a first temperature associated with battery overheating; and
detecting a second temperature associated with battery overheating;
wherein the second temperature is greater than the first temperature;
wherein, responsive to detection of the first temperature, battery charging is stopped; and
wherein, responsive to detection of the second temperature, the battery is permanently disabled.

14. The method according to claim 10, wherein a voltage imbalance among different groups of battery cells prompts disablement of the battery.

15. A program storage device readable by machine, tangibly embodying a program of instructions executable by the machine to perform acts comprising:
providing battery power to a computer system;
monitoring a plurality of battery conditions of a battery;
using a first fuse to prompt disabling battery power to the computer system responsive to a first voltage associated with a battery over-charge condition; and
using a second fuse to redundantly prompt disabling battery power to the computer system responsive to a second voltage associated with the battery over-charge condition;
wherein disablement responsive to the first voltage is independent of disablement responsive to the second voltage; and
wherein, the second fuse is prompted to disable battery power to the computer system as a back up to the first fuse;
measuring cell voltage when the battery is neither charging nor discharging power to a load; and
responsive to a voltage decrease over a predetermined threshold over a predetermined time period when the battery is neither charging nor discharging power to a load, triggering a third fuse to disable the battery.

16. An apparatus comprising:
a battery having a plurality of battery cells therein, said battery configured for powering a computer system; and
a control module which controls said battery and monitors a plurality of battery conditions;
said control module being configured to independently use a first fuse and a second fuse for disabling the battery, wherein to independently use a first fuse and a second fuse comprises:
using the first fuse to disable the battery responsive to a first voltage associated with a battery over-charge condition; and
using the second fuse to redundantly and permanently disable the battery responsive to a second voltage associated with the battery over-charge condition; and
wherein, the second fuse is prompted to disable battery power to the computer system as a back up to the first fuse; and
wherein said control module further acts to:
measure cell voltage when the battery is neither charging nor discharging power to a load; and
responsive to a voltage decrease over a predetermined threshold over a predetermined time period when the battery is neither charging nor discharging power to a load, trigger a third fuse to disable the battery.

* * * * *